United States Patent [19]
Cayen et al.

[11] 3,890,438
[45] June 17, 1975

[54] COMPOSITIONS AND METHODS FOR REDUCING BLOOD CHOLESTEROL

[75] Inventors: Mitchell N. Cayen; Dushan M. Dvornik, both of Montreal, Canada

[73] Assignee: American Home Products Corporation, New York, N.Y.

[22] Filed: Sept. 17, 1973

[21] Appl. No.: 398,130

[30] Foreign Application Priority Data
Oct. 6, 1972  Canada .............................. 153515

[52] U.S. Cl. ............................................. 424/240
[51] Int. Cl. ........................................... A61k 17/00
[58] Field of Search ................................... 424/240

[56] References Cited
UNITED STATES PATENTS
3,328,247  6/1967  Waring .............................. 424/240

OTHER PUBLICATIONS
Merck Index, 8th Ed., p. 270, (1968).

*Primary Examiner*—Elbert L. Roberts

[57] ABSTRACT

Pharmaceutical compositions useful for lowering blood cholesterol and methods for using same are disclosed. The compositions comprise a mixture of diosgenin or a related diosgenin derivative and a 4-substituted phenoxyisobutyric acid or an ester or salt thereof.

10 Claims, 2 Drawing Figures

Fecal [$^3$H] Cholesterol Excretion in Diosgenin Treated Rats Injected with [$^3$H] Cholesterol

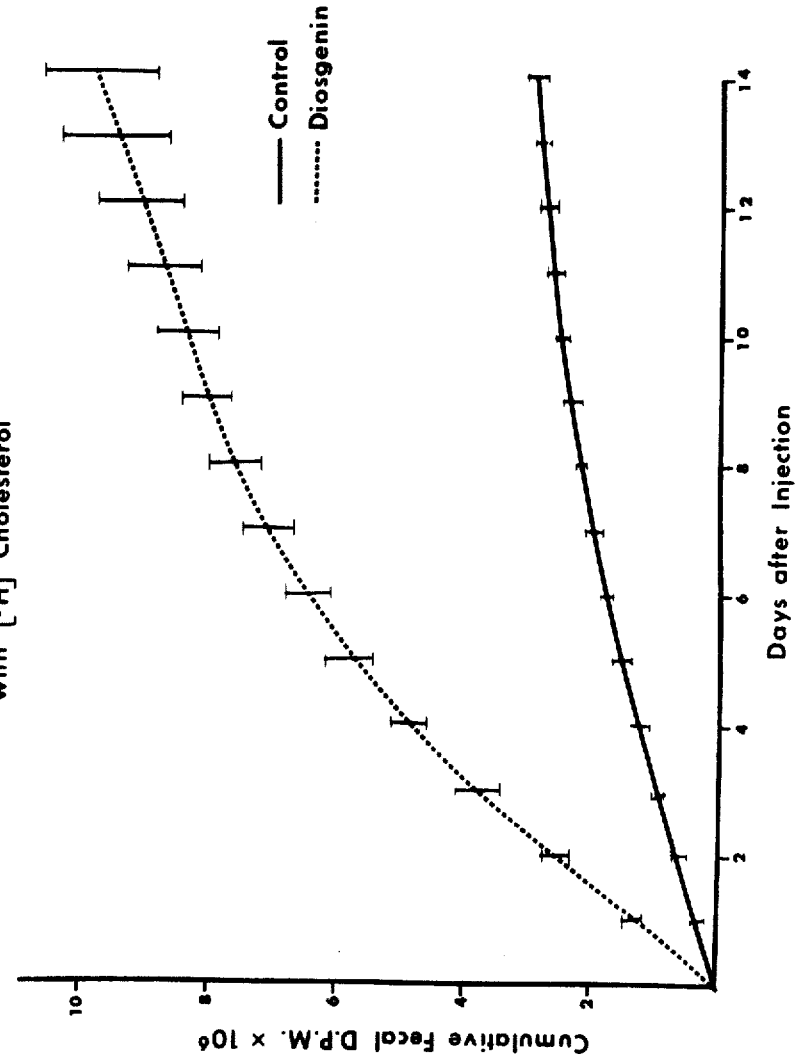

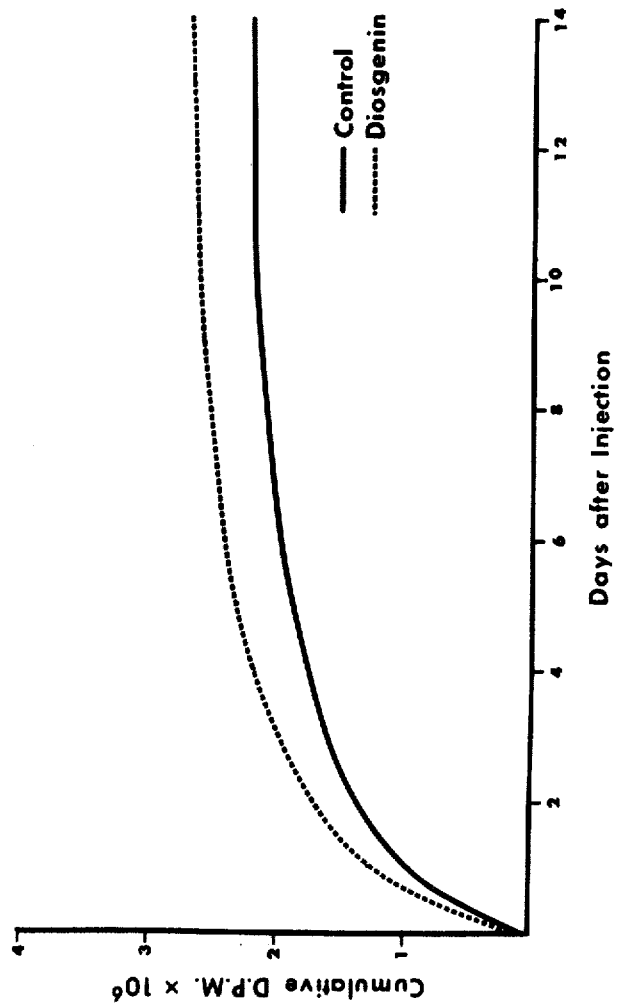

COMPOSITIONS AND METHODS FOR REDUCING BLOOD CHOLESTEROL

BACKGROUND OF THE INVENTION

1. Field of Invention

This invention relates to new pharmaceutical compositions and to methods for using same for reducing levels of cholesterol and triglycerides in the blood of humans suffering from hyperlipoproteinemia and associated conditions.

2. Description of the Prior Art

The association of excessive plasma concentrations of cholesterol and/or triglycerides with increased risk of heart attack, stroke, and sudden death is well established. Consequently, the consensus of informed opinion is that elevated levels of cholesterol and/or triglycerides should be reduced by appropriate long-term therapy. The recently introduced and generally accepted Frederickson-Levy-Lees classification of lipid disorders based on lipoprotein disturbances now allows a more rational choice of therapeutic programs for the treatment of hyperlipoproteinemia, see R. I. Levy, Fed. Proc., 30, 829 (1971).

The most common hyperlipoproteinemic syndrome is usually referred to as Type 11. The syndrome is characterized by elevated cholesterol levels together with triglyceride concentrations which may also be higher than normal. Type 11 is responsible for a sizeable portion of premature morbidity and mortality from coronary heart disease, R. A. Heinle, et al., Amer. J. Cardiol., 24, 178 (1969). The treatment of this disorder is one of the most frequent problems encountered by physicians. Because of the increased plasma cholesterol levels, treatment of Type 11 hyperlipoproteinemia must be based on measures aimed at controlling the metabolism and transport of cholesterol either by dietary restriction or by drug treatment. Indeed, a diet low in cholesterol and saturated fats is usually recommended, for example, see Levy, cited above. However, based on available data, dietary treatment is most likely to be ineffective, particularly if hypercholesterolemia is severe, R. I. Levy and D. S. Fredrickson, Postgrad. Med., 47, 130 (1970).

Regarding drug treatment of the Type 11 syndrome, a currently used approach is based on the binding and removal from the intestine of bile acids which are required for the absorption of cholesterol. Non-absorbable ion exchange resins are used for this purpose. Such resins are exemplified by cholestyramine. The mechanism of action for this class of drugs is to bind bile acids in the intestine whereby bile acid reabsorption is prevented; concomitantly, their elimination is increased through fecal excretion. Consequently the body tends to compensate for this effect by accelerating the degradation of cholesterol to bile acids which is followed by an increase in the rate of hepatic cholesterol synthesis. Apparently, in most humans, in particular those with Type 11 hyperlipoproteinemia, this binding of the bile acids results in a lowering of serum cholesterol, see W. L. Holmes, Clin. Med., 77, 41 (1970), and references therein. However, such resins have the disadvantages of being only moderately effective, requiring administration of large amount of the resin (ca. 12 to 32 g/day/ patient), having a disagreeable smell and taste, causing nausea and constipation and interfering with normal absorption of fat-soluble vitamins, iron and certain drugs, see for example, R. I. Levy and D. S. Frederickson, cited above, W. G. Thompson, Can. Med. Assoc. J., 104, 305 (1971) and F. B. Thomas, et al., Amer. J. Digest. Diseas., New Series, 17, 263 (1972). Indeed, Thompson, cited above, states succinctly, "The chief undesirable effects of long term cholestyramine therapy appears to result from malabsorption of fat soluble vitamins." Likewise, Thomas, et al., cited above, is concerned about the depletion of vitamin $B_2$ stores and the development of occult iron deficiency anemia.

Thus, at the present time, no single drug is completely satisfactory in the treatment of Type 11 hyperlipoproteinemia, see also, R. S. Lees and D. E. Wilson, New Engl. J. Med. 284, 186 (1971).

Recently, A. N. Howard and D. E. Hyams, Brit. Med. J., 3, 25 (1971), attempted to improve the efficacy of the non-absorbable ion exchange resins by treating Type II and Type IV hyperlipoproteinemia with a combination of such resins and the hypocholesteremic agent, clofibrate. (Clofibrate is generally recommended as the drug of choice for the treatment of Types III, IV and V hyperlipoproteinemia, see, Levy and Fredickson, cited above.) Although in most cases this treatment proved to be effective in lowering serum cholesterol levels, gastrointestinal upsets were noted due to the usual dosage of cholestyramine (16 g/day/-patient) or the related ion exchange resin, diethylaminoethyl dextran gel (DEAE Sephadex). Furthermore, the latter combination continues to interfere with the normal absorption of fat soluble vitamins, iron and drugs because of the unchanged physical properties of the ion exchange resin portion of the combination.

From the foregoing discussion it is apparent that for the treatment of Type II hyperlipoproteinemia, there is a need for effective therapy free from the aforementioned side effects and disadvantages of the presently available agents. Accordingly, the present invention discloses a method of treatment in keeping with this need. The present method of treatment utilizes a pharmaceutical composition which is not only effective for the treatment of the Type II syndrome specifically but also has the added advantage of being useful for the treatment of Type II to V hyperlipoproteinemia in general.

Other desirable features and advantages of the present invention will become apparent from the more detailed description of the invention which follows.

SUMMARY OF THE INVENTION

According to this invention a pharmaceutical composition comprising a blood cholesterol lowering amount of a mixture of compound of formula 1.

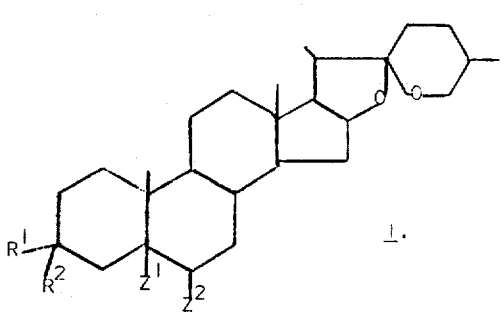

in which $R^1$ represents hydrogen, hydroxy, lower alkanoyloxy, lower alkoxy or halogen and $R^2$ represents hydrogen, or $R^1$ and $R^2$ together represent oxo; $Z^1$ represents hydrogen or hydroxy, $Z^2$ represents hydrogen or hydroxy or $Z^1$ and $Z^2$ together represent a carbon-carbon double bond or epoxy between C–5 and C–6, and a compound of formula II

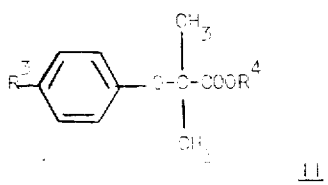

II in which $R^3$ represents halo, lower alkyl or lower alkoxy and $R^4$ represents hydrogen, lower alkyl, β-pyridylmethyl, an alkali metal or an alkaline earth metal, is administered to a hyperlipoproteinemic human whereby serum cholesterol and triglyceride levels are reduced or lowered.

DETAILS OF THE INVENTION

The compounds of formula I are either known, for example, spirost-5-en-3β-ol (diosgenin) spirost-5-en-3β-ol acetate (diosgenin acetate), 5β-spirostan-3β-ol (smilagenin) or they may be prepared by known methods; for example, see L. F. Fieser and M. Fieser, "Steroids", Reinhold Publishing Corp., New York, 1959 and W. Klyne, "The Chemistry of the Steroids", Methuen & Co., Ltd., London, 1957.

The compounds of formula II are described in U.S. Pat. No. 3,262,850, issued July 26, 1966, except for the compounds of formula II in which $R^4$ is β-pyridylmethyl. The latter compounds are described in U.S. Pat. No. 3,369,025, issued Feb. 13, 1968.

The term "lower alkyl" as used herein contemplates straight chain alkyl radicals containing from one to six carbon atoms and branched chain alkyl radical containing up to four carbon atoms and includes methyl, ethyl, propyl, isopropyl, butyl, isobutyl, and the like.

The term "lower alkoxy" as used herein contemplates both straight and branched chain alkoxy radicals containing from one to four carbon atoms and includes methoxy, ethoxy, isopropoxy, t-butoxy and the like.

The term "lower alkanoloxy" as used herein contemplates both straight and branded chain alkanoyloxy radicals containing from two to six carbon atoms and includes acetoxy, propionyloxy, pivaloyloxy, hexanoyloxy and the like.

The term "halo" as used herein contemplates halogens and includes fluorine, chlorine, bromine and iodine.

The pharmaceutical compositions of this invention are administered to hyperlipoproteinemic patients either alone or formulated with a pharmaceutically acceptable carrier. The active ingredients may also be mixed with a preferred beverage, for example water, milk or a fruit juice or with a preferred food, for example, soups or a pulpy fruit. Advantageously the compositions of this invention are given orally.

Suitable pharmaceutical formulations include tablets comprising the active ingredients and known pharmaceutical carriers and excipients such as starch, sugars, lubricants, certain types of clay and the like. Also included are suspensions or syrups, in which the active ingredients ordinarily constitute 10 to 60% by weight of the composition associated with a pharmaceutically acceptable suspending agent. Suitable suspending agents are described in "Remington's Practice of Pharmacy," E. W. Martin, et al., Mack Publishing Co., Easton, Penn., 1961, and include water soluble gums, for example, gum arabic, gum tragacanth and other pharmaceutically acceptable suspending or dispersing agents, for example, pectin, sodium alginate, alginic acid, acacia mucilage, carboxypolymethylene, sodium carboxymethyl cellulose, agar, bentonite, cetyl alcohol, gelatin, methyl cellulose, polyvinyl alcohol, polyvinylpyrrolidone, propylene glycol monostearate, sodium lauryl sulfate, sorbitan monooleate, stearyl alcohol, carrageenin, malt extract, oleyl alcohol, quillaja, tragacanth mucilage and the like. For example, pectin may be associated with or added to the active ingredients in proportions ranging from 20 percent to about 80 percent on a weight/weight basis to effect a more uniform dispersion of the active ingredients in the gastrointestinal tract.

An example of a suitable therapeutic composition of this invention may be prepared by mixing in a mechanical blender 75.0 g. of diosgenin, 25.0 g. of clofibrate and 100 g of pectin. Other pharmaceutically acceptable suspending agents may be used in a similar manner. The resulting mixture is then placed in capsules or envelopes in amounts of 2.0 g., 1.0 g. or 0.5 g. each to provide 100, 200 or 400 capsules or envelopes, respectively. The capsules may be administered directly or opened and the contents slurried or suspended in a suitable beverage or food.

Generally, treatment is initiated with small dosages substantially less than the optimum dose of the compound. Thereafter, the dosage is increased by small increments until the optimum effect under the circumstances is reached. In general, the pharmaceutical compositions of this invention are most desirably administered at a concentration level that will generally afford effective results without causing any harmful or deleterious side effects and preferably at a level that is in a range of from about 1 to about 10 g per day per patient with the amount of the compound of formula II therein ranging from 5 to 40%. In other words the ratio of the compounds of formulae I and II ranges from 19:1 to 3:2 on a weight to weight basis, respectively. However, a dosage level that is in the range of from about 3.0 g to about 6.0 g per day per patient with the amount of the compound of formula II therein ranging from 10 – 33% is most desirably employed in order to achieve effective results. In this latter preferred case the ratio of the mixture of the compounds of formulae I and II ranges from 9:1 to 2:1 on a weight basis. These daily doses may be divided and given preferably before or during meals.

With reference to the method of this invention the therapeutic treatment comprises the administration of two agents which by acting together suppress the elevated levels of both cholesterol and triglycerides. Furthermore, the combination produces a greater decrease in plasma cholesterol levels that either agent alone. As noted the two agents are selected from diosgenin or a related diosgenin derivative and a 4-substituted phenoxyisobutyric acid or an ester or salt thereof.

With respect to the method of treatment, the two active agents of the composition of this invention can be administered in combination or separately so long as the daily dosage is equivalent to the aforementioned dosage schedule, i.e., the daily total amount of compounds of formula I and II is in the range of one to ten grams per day per patient and the amounts of the two agents being in a ratio ranging from 19:1 to 3:2 on a weight:weight basis, respectively.

Notwithstanding the facts that diosgenin is known to inhibit cholesterol absorption in experimental animals, for example see J. C. Diaz Zagoya, et al., Biochem. Pharmacol., 20, 3473 (1971) and that 4-chlorophenoxyisobutyric acid ethyl ester (clofibrate) is generally accepted as the drug of choice for the treatment of Types III, IV and V hyperliproteinemia, it is indeed noteworthy that the combination of this invention provides treatment for Type II hyperlipoproteinemia as well as a general treatment of hyperlipoproteinemia without the incidence of side effects associated with the ion exchange resins. Attention should also be given to the finding that the therapy of this invention does not enhance the biosynthesis of cholesterol in the body. In addition, unlike the ion exchange resins, the present therapy does not disrupt the normal function of the bile acids so that the absorption of fat soluble vitamins is allowed to proceed normally. Likewise the present method of treatment avoids disrupting the normal absorption of iron and other drugs noted above.

The hypocholesterolemic and triglyceride lowering properties of the compositions of the present invention may be demonstrated in standard pharmacologic tests, for example, in procedures similar to the in vivo tests described by C. H. Duncan and M. M. Best, Amer. J. Clin. Nutr., 10, 297 (1962), and by the general tests described by L. W. Kinsell in "Pharmacologic Techniques in Drug Evaluation," Vol. 2, P. E. Siegler and J. H. Moyer, Eds., Year Book Medical Publishers, Inc., Chicago, 1967, pp. 711 - 720.

The characteristic property of the present compositions not to interfere with normal absorption of fat soluble vitamins is demonstrable in the test described by W. G. Thompson and G. R. Thompson, Gut, 10, 717 (1969).

The characteristic property of the present compositions not to inhibit normal iron absorption is demonstrable in the test described by F. B. Thomas, et al., cited above.

The characteristic property of the present compositions to reduce triglyceride levels is demonstrable by the method of M. Kraml and L. Cosyns, Clin. Biochem., 2, 373 (1969).

The following examples illustrate further the desirable pharmacologic properties of this invention.

In the following examples, cholesterol levels were determined by the method of A. Zlatkis, et al., Biochemistry, 5, 1060 (1966), cholesterol biosynthesis was measured by the method of M. Cayen and D. Dvornik, Can. J. Biochem., 46, 179 (1968) and cholesterol and bile acid excretion was determined by a modification of the method of A. M. Bongiovanni, J. Clin. Endocrinol. 25, 678 (1965).

EXAMPLE 1

Effect of combined administration of clofibrate and diosgenin on serum and liver cholesterol levels in the cholesterol-fed rat Male rats were fed for 1 week Purina chow supplemented with 1% cholesterol in addition to 0.075% clofibrate, 0.5% diosgenin or both. Animals were decapitated and serum and liver cholesterol levels were measured. The results show that the combination of clofibrate and diosgenin produced a greater decrease in serum cholesterol levels than either agent alone. The data also show that diosgenin reduced the liver uptake of dietary cholesterol. Thus, the agents produced a combined effect on serum cholesterol levels in the cholesterol-fed rat.

| Group | Serum Cholesterol (mg/100 ml)[a] | Percent Reduction of Elevated Serum Cholesterol | Liver Cholesterol (mg/100 g)[a] |
|---|---|---|---|
| No dietary supplement | 41.6 ± 0.82 | | 293 ± 7 |
| Cholesterol | 56.6 ± 1.77 | | 738 ± 51 |
| Cholesterol + clofibrate | 44.1 ± 1.78[d] | 22% | 780 ± 89 |
| Cholesterol + diosgenin | 46.2 ± 2.32[c] | 19% | 270 ± 9[c] |
| Cholesterol + clofibrate + diosgenin[b] | 36.0 ± 1.72[c] | 36% | 277 ± 13 |

[a]Mean ± standard error for 10 rats per group. Significance level compared with group treated with cholesterol.
[b]Significance level compared with group treated with clofibrate.
[c]$P<0.01$.
[d]$P<0.001$.

In the same manner, but replacing diosgenin with 5β-spirostan-3β-ol, 5α-spirostan-3β,5,6β-triol, spirost-5-en3β-ol acetate, 5β-spirostan-3β-ol acetate, 5β-spirostan-3-one, 5β-spirostan-3α-ol, 5α-spirostan-3β,5-diol, 3β-chlorospirost5-ene or spirost-5-ene and/or replacing clofibrate with methyl 2-(4-methylphenoxy)-2-methylpropionate, propyl 2-(4-propylphenoxy)-2-methylpropionate, ethyl 2-(4-methoxyphenoxy)-2-methylpropionate, 3-pyridylmethyl 2-(4-chlorophenoxy)-2-methylpropionate, or 3-pyridylmethyl 2-(4-ethoxyphenoxy)-2-methylpropionate, a combined effect on serum cholesterol in cholesterol-fed rats is similarly demonstrated.

EXAMPLE 2

Effect of combined administration of clofibrate and diosgenin on cholesterol biosynthesis in the rat Male albino rats (100 g body weight) were fed for 1 week Purina chow supplemented with 0.25% clofibrate, 1% diosgenin, or both. Animals were killed, liver homogenates were prepared, incubated with [2-$^{14}$C]acetate and the incorporation into cholesterol was measured. The results show that diosgenin increased the rate of hepatic cholesterol synthesis (because of the interruption of the enterohepatic circulation of cholesterol). In rats ingesting both agents simultaneously, clofibrate suppressed the diosgenin induced increase in cholesterogenesis. The data show that clofibrate and diosgenin elicited a combined effect in the rat.

| Group | [$^{14}$C] d.p.m. cholesterol/ mg nitrogen[a] |
|---|---|
| Controls | 1,570 ± 220 |
| Diosgenin | 23,200 ± 2,750 |
| Clofibrate | 100 ± 24 |
| Clofibrate + diosgenin | 680 ± 190[b] |

[a]Mean ± standard error for 9 rats per group.
[b]97% inhibition, as compared with diosgenin alone.

In the same manner, but replacing diosgenin with 5β-spirostan-3β-ol, 5α-spirostan-3β,5,6β-triol, spirost-5-en3β-ol acetate, 5β-spirostan-3β-ol acetate,5β-spirostan-3-one, 5β-spirostan-3α-ol, 5α-spirostan-3β,5-diol, 3β-chlorospirost5-ene or spirost-5-ene and/or replacing clofibrate with methyl 2-(4-methylphenoxy)-2-methylpropionate, propyl 2-(4-propylphenoxy)-2-methylpropionate, ethyl 2-(4-methoxyphenoxy)-2-methylpropionate, 3-pyridylmethyl 2-(4-chlorophenoxy)-2-methylpropionate, or 3-pyridylmethyl 2-(4-ethoxyphenoxy)-2-methylpropionate, a combined effect on hepatic cholesterogenesis is elicited.

EXAMPLE 3

Effect of diosgenin on cholesterol absorption in the rat

Male albino rats (120 - 130 g body weight) were fed for 1 week Purina chow supplemented with 1% cholesterol and different doses of diosgenin. Animals were decapitated and liver cholesterol levels were measured. The results presented in the table show that diosgenin reduced liver cholesterol levels in a dose dependent manner.

| GROUP | Liver Cholesterol (mg/100 g)[a] | Reduction of Elevated Cholesterol (%) |
|---|---|---|
| No supplement | 232 ± 8 | — |
| 1% Cholesterol | 574 ± 54 | — |
| 1% Cholesterol + 1% diosgenin | 244 ± 4[b] | 96% |
| 1% Cholesterol + 0.25% diosgenin | 276 ± 5[b] | 87% |
| 1% Cholesterol + 0.1% diosgenin | 374 ± 20[b] | 59% |

[a]Mean ± standard error for 10 rats per group.
[b]P<0.001, as compared to group fed 1% cholesterol.

In the same manner but replacing diosgenin with 5β-spirostan-3β-ol, 5α-spirostan-3β,5,6β-triol, spirost-5-en3β-ol acetate, 5β-spirostan-3β-ol acetate, 5β-spirostan-3-one, 5β-spirostan-3α-ol, 5α-spirostan-3β,5-diol, 3β-chlorospirost-5-ene or spirost-5-ene, liver cholesterol levels in cholesterol fed rats are lowered similarly.

EXAMPLE 4

Effect of diosgenin on sterol and bile acid excretion

Male albino rats (120 - 130 g) were fed for 1 month Purina chow supplemented with 1% diosgenin. Animals were given an intraperitoneal injection of [$^3$H] cholesterol and [$^{14}$C] bile acid (cholic acid) and fecal excretion of radioactivity associated with cholesterol and bile acids was measured. The results shown in FIGS. 1 and 2 demonstrate that diosgenin markedly increased cholesterol excretion but had no effect on bile acid excretion.

In the same manner but replacing diosgenin with 5β-spirostan-3β-ol, 5α-spirostan-3β,5,6β-triol, spirost-5-en-3β-ol acetate, 5β-spirostan-3β-ol acetate, 5β-spirostan-3-one, 5β-spirostan-3α-ol, 5α-spirostan-3β,5-diol, 3β-chlorospirost-5-ene or spirost-5-ene, cholesterol and excretion was markedly increased with no effect upon bile acid excretion.

We claim:

1. A method of reducing levels of blood cholesterol in humans which comprises administering to said humans a blood cholesterol lowering amount of a mixture of compound of formula 1.

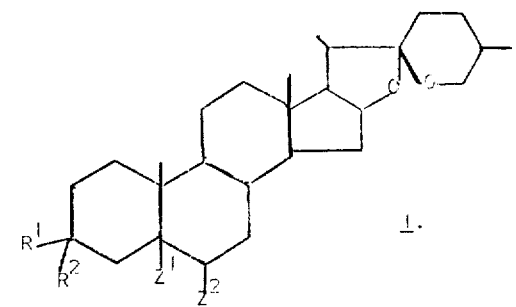

in which R$^1$ represents hydrogen, hydroxy, lower alkanoyloxy, lower alkoxy or halo and R$^2$ represents hydrogen, or R$^1$ and R$^2$ together represent oxo; Z$^1$ represents hydrogen or hydroxy, Z$^2$ represents hydrogen or hydroxy or Z$^1$ and Z$^2$ together represent a carbon-carbon double bond or epoxy between C-5 and C-6, and a compound of formula 11

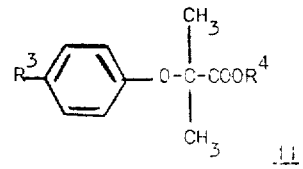

in which R$^3$ represents halo, lower alkyl or lower alkoxy and R$^4$ represents hydrogen, lower alkyl, β-pyridylmethyl, an alkali metal or an alkaline earth metal; said mixture of the compounds of formula 1 and 11 being in a ratio ranging from 19:1 to 3:2 on a weight:weight basis, respectively.

2. A method as claimed in claim 1 in which the blood cholesterol lowering amount of the mixture is in the range of 1.0 to 10.0 g/day/patient; said mixture of the compounds of formulae I and II being in a ratio ranging from 19:1 to 3:2 on a weight:weight basis, respectively.

3. A method as claimed in claim 1 in which the blood cholesterol lowering amount of the mixture is in the range of 3.0 to 6.0 g/day/patient; said mixture of the compounds of formulae I and II being in the range of from 9:1 to 2:1 on a weight:weight basis, respectively.

4. A method as claimed in claim 1 in which the blood cholesterol lowering amount is administered orally.

5. A method as claimed in claim 1 in which the compound of formula I is diosgenin and the compound of formula II is clofibrate.

6. A pharmaceutical composition for oral administration to humans to lower blood cholesterol comprising a mixture of compound of formula I,

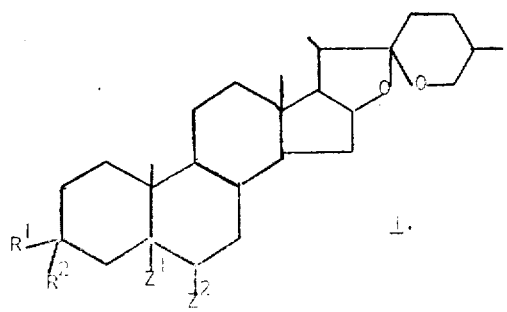

in which $R^1$ represents hydrogen, hydroxy, lower alkanoyloxy, lower alkoxy or halo and $R^2$ represents hydrogen, or $R^1$ and $R^2$ together represent oxo; $Z^1$ represents hydrogen or hydroxy, $Z^2$ represents hydrogen or hydroxy or $Z^1$ and $Z^2$ together represent a carbon-carbon double bond or epoxy between C-5 and C-6, and a compound of formula II

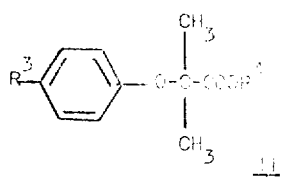

in which $R^3$ represents halo, lower alkyl or lower alkoxy and $R^4$ represents hydrogen, lower alkyl, β-pyridylmethyl, and alkali metal or an alkaline earth metal, said mixture of the compounds of formula I and II being in the ratio ranging from 19:1 to 3:2 on a weight:weight basis, respectively.

7. A pharmaceutical composition as claimed in claim 6 in which the compound of formula I is diosgenin and the compound of formula II is clofibrate.

8. A pharmaceutical composition for oral administration to humans to lower blood cholesterol comprising a mixture of compound of formula I.

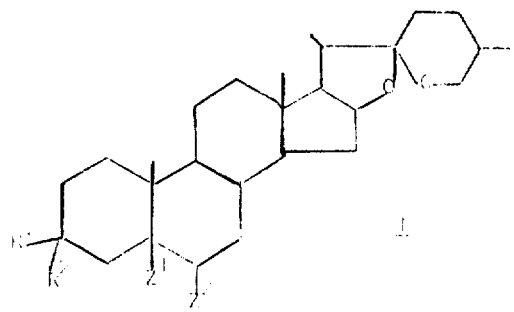

in which $R^1$ represents hydrogen, hydroxy, lower alkanoyloxy, lower alkoxy or halo and $R^2$ represents hydrogen, or $R^1$ and $R^2$ together represent oxo; $Z^1$ represents hydrogen or hydroxy, $Z^2$ represents hydrogen or hydroxy or $Z^1$ and $Z^2$ together represent a carbon-carbon double bond or epoxy between C-5 and C-6, and a compound of formula II

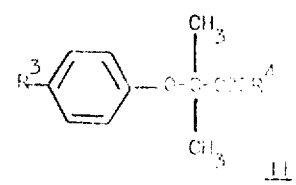

in which $R^3$ represents halo, lower alkyl or lower alkoxy and $R^4$ represents hydrogen, lower alkyl, β-pyridylmethyl, and alkali metal or an alkaline earth metal, said mixture of the compounds of formula I and II being in the ratio ranging from 19:1 to 3:2 on a weight:weight basis, respectively, together with a pharmaceutically acceptable suspending agent.

9. The method of claim 3 in which the compound of formula I is diosgenin and the compound of formula II is clofibrate.

10. The pharmaceutical composition of claim 8 wherein the compound of formula I is diosgenin and the compound of formula II is clofibrate.

* * * * *